United States Patent
Marsh et al.

(10) Patent No.: US 9,528,518 B2
(45) Date of Patent: Dec. 27, 2016

(54) SYSTEM, APPARATUS AND METHODS FOR DIVERTING AIRFLOW TO A PRESSURE SOURCE

(71) Applicants: Thomas Robert Marsh, Columbus, IN (US); Cory L. Robinson, Indianapolis, IN (US)

(72) Inventors: Thomas Robert Marsh, Columbus, IN (US); Cory L. Robinson, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 367 days.

(21) Appl. No.: 14/305,519

(22) Filed: Jun. 16, 2014

(65) Prior Publication Data
US 2015/0361871 A1 Dec. 17, 2015

(51) Int. Cl.
| F02B 33/44 | (2006.01) |
| F04C 29/12 | (2006.01) |
| F02B 37/16 | (2006.01) |
| F04C 23/00 | (2006.01) |

(52) U.S. Cl.
CPC ............. F04C 29/12 (2013.01); F02B 37/164 (2013.01); F04C 23/006 (2013.01)

(58) Field of Classification Search
CPC ........... F02B 37/16; F04C 29/12; F04D 25/04; F04D 27/009; F04D 27/0207; F04D 27/0215; F04D 27/023; F05B 2270/1081
USPC ........... 60/597–598, 611–612; 123/562, 564; 415/144–145, 205–206; 417/407; 137/561 A See application file for complete search history.

(56) References Cited

U.S. PATENT DOCUMENTS

| 3,027,706 | A | 4/1962 | Sprick |
| 3,389,553 | A | 6/1968 | Hardy et al. |
| 4,299,090 | A | 11/1981 | Deutschmann |
| 4,464,902 | A | 8/1984 | Mendle et al. |
| 5,427,079 | A | 6/1995 | Andrepont, Jr. et al. |
| 5,440,881 | A | 8/1995 | Sudmanns et al. |
| 6,261,333 | B1 | 7/2001 | Dickson |
| 6,766,645 | B2 | 7/2004 | Zimmer et al. |
| 7,043,915 | B2 | 5/2006 | Anello |
| 7,251,989 | B2 * | 8/2007 | Baeuerle ............. F02D 41/0007 73/114.37 |
| 8,096,289 | B2 | 1/2012 | Braun et al. |
| 2010/0314186 | A1 | 12/2010 | Ma |
| 2011/0067678 | A1 | 3/2011 | Burkhardt et al. |
| 2011/0081257 | A1 | 4/2011 | Kley et al. |
| 2011/0308494 | A1 * | 12/2011 | Lukasavitz ...... F02M 35/10118 123/198 E |
| 2013/0192567 | A1 * | 8/2013 | Sujan .................. F02D 41/0007 60/605.1 |
| 2014/0000570 | A1 | 1/2014 | Gibby |

* cited by examiner

*Primary Examiner* — Nicholas J Weiss
*Assistant Examiner* — Ngoc T Nguyen
(74) *Attorney, Agent, or Firm* — Taft, Stettinius & Hollister LLP

(57) ABSTRACT

Systems, apparatus, and methods are disclosed for diverting a portion of intake airflow from a pressure source in an internal combustion engine system. The intake airflow is diverted to, for example, an air compressor at the intake of the pressure source before the airflow is pressurized by the pressure source.

25 Claims, 3 Drawing Sheets

SYSTEM, APPARATUS AND METHODS FOR DIVERTING AIRFLOW TO A PRESSURE SOURCE

FIELD OF THE INVENTION

The present invention relates generally to internal combustion engines and turbochargers, and more particularly to systems, devices and methods for diverting air flow to a pressure source in such systems.

BACKGROUND

Environmental concerns, legislative mandates, and operating costs are increasing demand for improved fuel economy for internal combustion engines. Some internal combustion engine systems bleed or divert a portion of pressurized air from an intake to the internal combustion engine into the inlet of an air compressor, reducing the overall work of the compressor for the same output. However, the use of pressurized intake air to drive flow into the air tank reduces fuel economy since boosted air is diverted from the intake to the engine, which is difficult to compensate for in engine controls, thus causing the engine to run at non-optimal fueling.

Furthermore, systems which provide non-boosted fresh airflow to the compressor require significant plumbing additions, which can affect the operating conditions of the engine. For example, turbocharged engine systems require plumbing to be added to provide a separate fresh air intake to the air compressor, and/or require plumbing additions at locations significantly spaced apart from the turbocharger compressor to avoid oil pull-over from the air compressor. These off-engine plumbing solutions require application-specific hardware design, thus creating a lack of continuity in the design and the need to develop new designs for new applications. These systems may also require separate filtration for the air compressor air supply, which increases ownership costs and decreases reliability. Therefore, further technological developments are desirable in this area.

SUMMARY

One embodiment is a unique system, method and/or apparatus for diverting a portion of fresh airflow at an intake of a pressure source of an internal combustion engine system before the air is pressurized by the pressure source. In a specific embodiment, a diverter is mounted to an intake of the pressure source and diverts the portion of the fresh airflow to provide non-boosted airflow to an air compressor. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like numerals refer to like parts throughout the several views, and wherein.

DESCRIPTION OF THE ILLUSTRATIVE EMBODIMENTS

Figure 1:
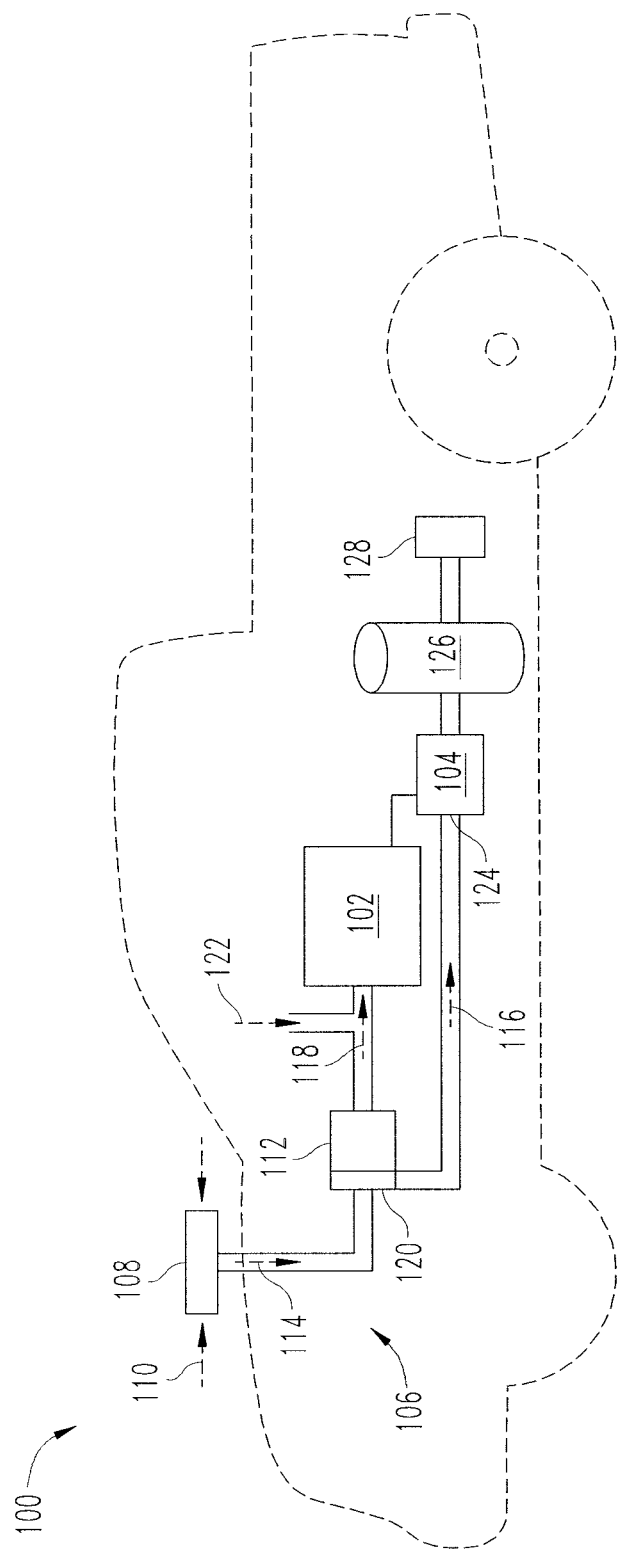
FIG. 1 is a schematic block diagram of one embodiment of an internal combustion engine and air compressor system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic block diagram of one embodiment of a system 100 for a vehicle with an internal combustion engine 102 and an engine-driven air compressor 104. The system 100 includes an air intake assembly 106 to provide a source of intake fresh airflow 114 to engine 102 and air compressor 104. The air intake assembly 106 includes an air inlet 108 that draws ambient air 110 toward a pressure source 112. The pressure source 112 receives intake fresh airflow 114 from inlet 108 and outlets a pressurized fresh airflow 118 to engine 102. In certain embodiments, the pressure source 112 is a turbocharger, however, in other embodiments the pressure source can be a positive displacement supercharger, a dynamic compression supercharger, and/or any other device capable of receiving and outputting the intake fresh airflow 114 with increased pressure.

In certain embodiments, the air intake assembly 106 may include a number of features not shown in FIG. 1, including an air filter, noise reduction and flow altering devices, such as, but not limited to, baffles. Furthermore, the pressure source 112 can be in flow communication with a charge air cooler or an intercooler between pressure source 112 and the engine 102. A flow meter, such as mass airflow sensor (MAF), can be disposed upstream of the pressure source 112, such as at or near a compressor inlet of a turbocharger.

At the inlet on an upstream side of pressure source 112, a diverter 120 diverts intake fresh airflow 114 to a compressor fresh airflow 116 bound for air compressor 104. Downstream of the pressure source 112, the pressurized airflow can be provided as engine fresh airflow 118 bound for an internal combustion engine 102. The internal combustion engine 102 can be a diesel engine, a gasoline engine, or any other type of internal combustion engine 102. The system 100 can further include an exhaust gas recirculation system 122 which recirculates a portion of exhaust gas that mixes with the engine fresh airflow 118 bound for the internal combustion engine 102 downstream of the pressure source 112.

The air compressor 104 receives the compressor fresh airflow 116 at an inlet 124. It is contemplated that air compressor 104 can be any known compressor, such as a single cylinder positive-displacement air compressor, a multiple piston positive-displacement compressor, a rotating impeller-type compressor, or any type of compressor which receives and outputs the compressor fresh airflow 116 with increased pressure. It is also contemplated that air compressor 104 can be mechanically coupled to engine 102, or driven by a separate motor. The compressed air from the air compressor 104 can be stored in an air tank 126. The compressed air can be provided to a pneumatic device 128, such as, but not limited to, air brakes, suspension equipment, and/or any other pneumatic devices or systems of the vehicle.

Referring to FIGS. 2-5, one embodiment of diverter 120 is shown mounted to the inlet side of pressure source 112. Pressure source 112 includes a housing 130 that includes an inlet 132 defining a passage 134 for receiving fresh airflow 114 from air inlet 108. Housing 130 of pressure source 112 further includes an outlet 136 for delivering pressurized engine airflow 118 to engine 102.

Diverter 120 includes an inner member 140 mounted to housing 130 within inlet 132 and an adapter member 160 mounted to the outer perimeter of inlet 132 of housing 130. Inner member 140 and adapter member 160 define a diversion passage 180 immediately upstream of an outer end portion 138 of inlet 132 that receives fresh airflow 114 before it is pressurized by pressure source 112. The diverted fresh airflow 114 is passed through a flowpath defined by an outlet member 162 of adapter member 160 to provide compressor airflow 116 to air compressor 104.

Inner member 140 includes a cylindrical body 142 that defines an inner flow passage 144 to receive fresh airflow 114 and provide fresh airflow 114 to pressure source 112. Cylindrical body 142 extends between an inlet end 146 and an outlet end 148. Adjacent to inlet end 146, cylindrical body 142 includes an outer flange 150 extending radially outwardly from and circumferentially around cylindrical body 142. Flange 150 is positioned in outer end portion 138 of inlet 132 and in engagement with an inner ledge 136 defined by inlet 132. Inner ledge 136 axially faces an upstream direction and extends radially inwardly from an inner surface 137 of inlet 132. Inner surface 137 extends along the interior of inlet 132 at outer end portion 138 from inner ledge 136 to an outer end of inlet 132.

An elongated portion 152 of cylindrical body 142 extending from flange 150 to outlet end 148 is spaced radially inwardly from an inner wall surface 133 of inlet 132. An inlet portion 154 of cylindrical body 142 extends from flange 150 to inlet end 146 upstream of inlet end portion 138 of inlet 132. Inlet portion 154 includes an outer surface profile 156 that tapers in an upstream direction from flange 150 to form a rounded nose 158 at inlet end 146. Rounded nose 158 forms an entrance into diversion passage 180 that diverts fresh airflow 114 into diversion passage 180 and into inner flow passage 144. The entrance into diversion passage 180 extends 360 degrees around inlet end 146 of inner member 140. Rounded nose 158 and the tapered surface profile 156 reduce recirculation by eliminating or reducing venturi effects or vacuums at the entrance to diversion passage 180, which could result in oil pull-over from compressor 104, particularly at high airflow conditions to the pressure source 112.

Adapter member 160 of diverter 120 includes a tubular body 164 with an inner surface that defines a central passage 166 for receiving fresh airflow 114 upstream of inlet 132. Body 164 includes an inlet end portion 168 that projects axially outwardly and upstream from inlet end portion 138 of inlet 132. Body 164 also includes a mounting portion 170 that is positioned around and mounted to inlet 132. Inlet end portion 168 is spaced circumferentially from and around inlet portion 154 of cylindrical body 142 to define diversion passage 180 therebetween.

Mounting portion 170 defines an inner diameter that is configured to receive outer end portion 138 of inlet 132 in close fitting engagement. Mounting portion 170 further includes an end flange 172 that abuts a mounting flange 139 that extends radially outwardly from and around outer end portion 138 of inlet 132 with a sealing member 194 therebetween. Sealing member 194 can be an elastomer O-ring, gasket, or any suitable sealing member between inlet 132 and adapter member 160. Sealing member 194 may be co-molded, adhered, frictionally engaged, or otherwise secured to the surface of mounting flange 139 and/or end flange 172.

Figure 2:
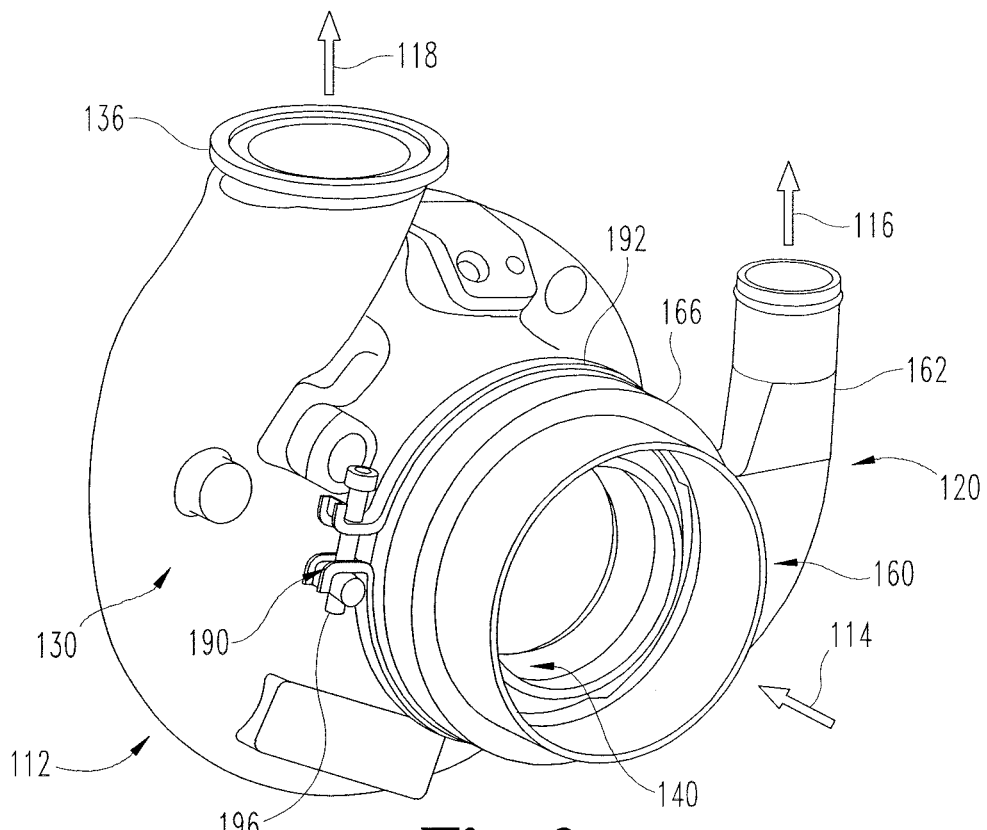
FIG. 2 is a perspective view of a diverter mounted to an inlet of a pressure source.
Figure 3:
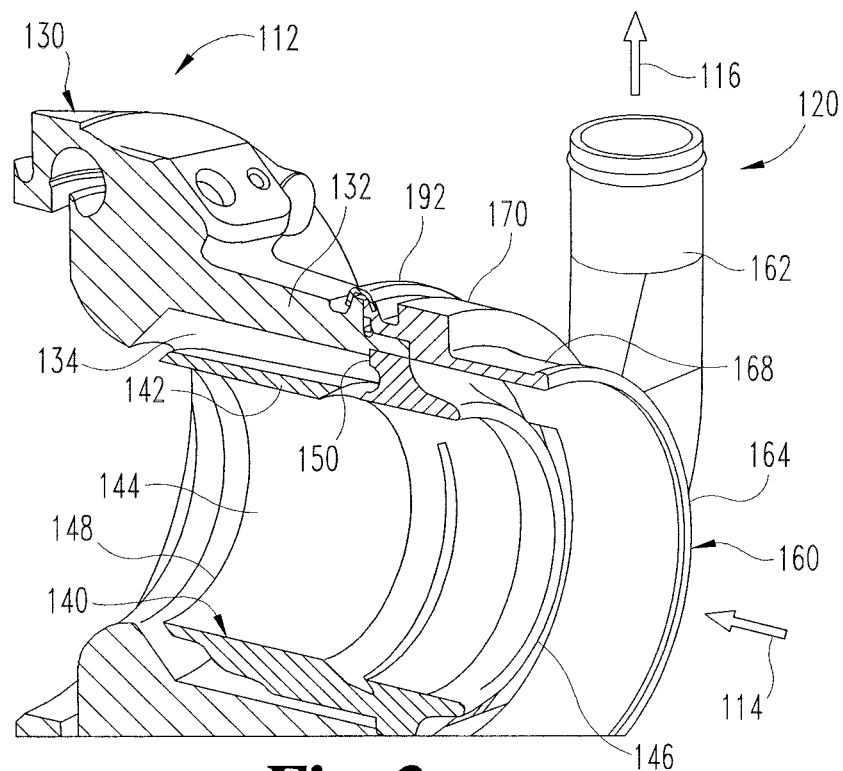
FIG. 3 is a section of the perspective view of the diverter and a portion of the pressure source of FIG. 2.
Figure 4:
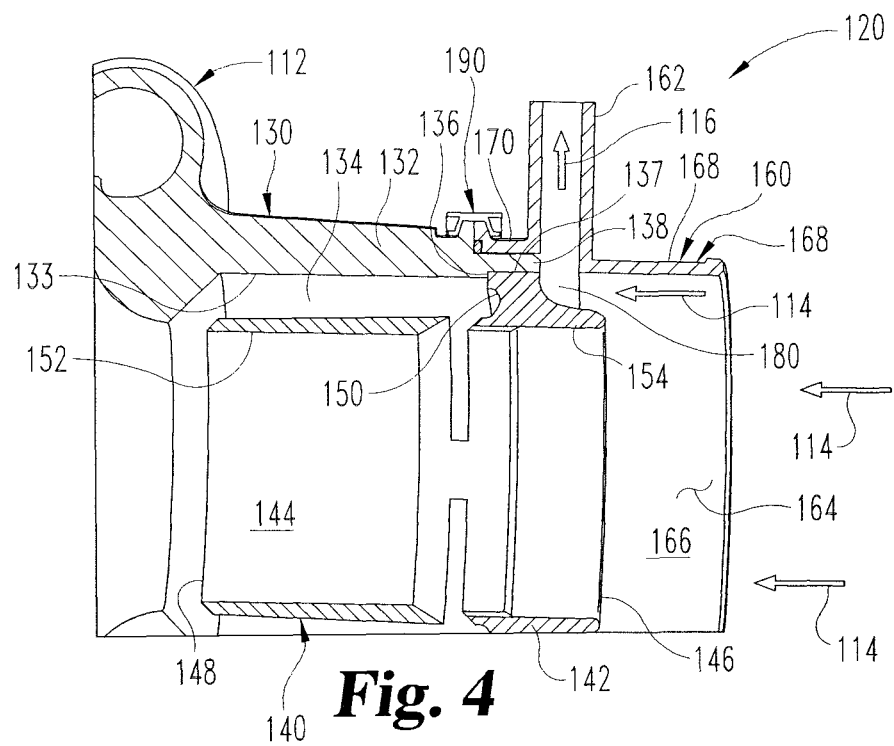
FIG. 4 is a section view along the intake airflow axis of a portion of the diverter and pressure source of FIG. 2.
Figure 5:
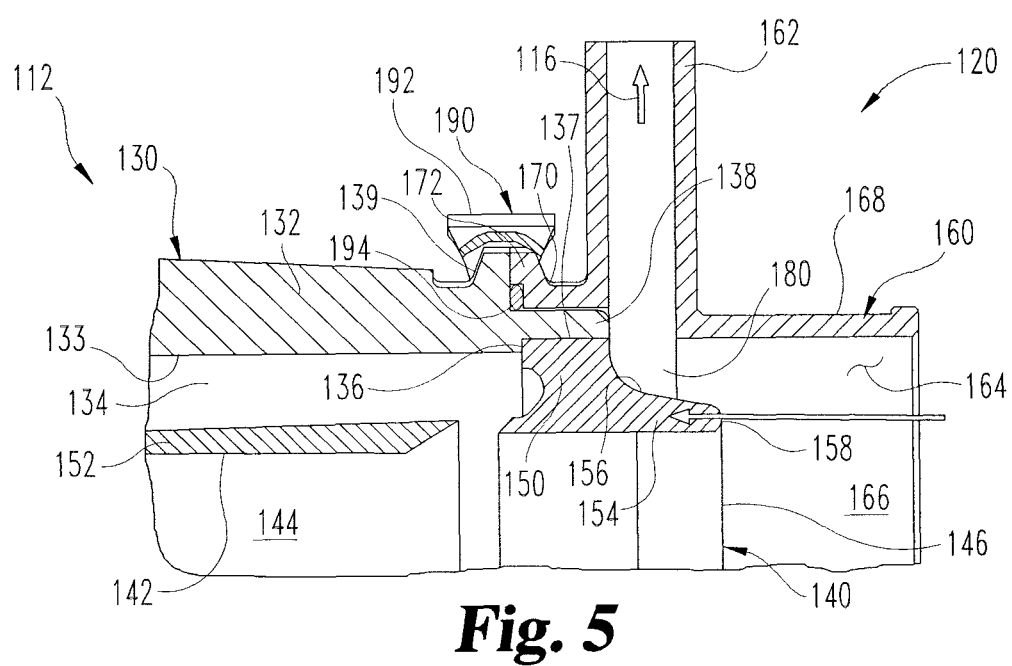
FIG. 5 is another section view along the intake airflow axis of a portion of the diverter and pressure source of FIG. 2.

Adapter member 160 is secured to inlet 132 with a clamp assembly 190. Clamp assembly 190 includes, in the illustrated embodiment, a band member 192 that spans and compressively engages mounting flange 139 and end flange 172 against one another, and is held in such engagement with a compression fastener 196 connecting adjacent ends of band member 192 in adjustable relation to one another, as shown in FIG. 2. However, any suitable arrangement for engaging adapter member 160 to inlet 132 is contemplated.

In one embodiment, the mounting arrangement permits circumferential rotation of adapter member 160 around inlet 132 so that outlet member 162 can be arranged at any desired orientation relative to inlet 132 for connection to, for example, air compressor 104. Outlet member 162 is connected with plumbing extending to air compressor 104. Any suitable fastening arrangement connection of the air compressor plumbing to outlet member 162 is contemplated. Furthermore, adapter member 160 can be engaged to inlet 132 by any one or combination of a sealingly tight fit with a sealing member, a friction fit, fasteners, clamps, bolts, screws, weld, or other retention device or method.

The provision of diversion passage 180 completely around the circumference of inlet 132 avoids disruption of the airflow pattern to pressure source 112. Furthermore, the apparatus providing the diversion of fresh airflow 114 is mounted on the inlet of the turbocharger compressor which eases assembly and eliminates the need for separate plumbing to be installed by a third party to provide fresh airflow to the air compressor 104. The elimination of separate plumbing also eliminates the need for additional filtration, and provides an air take-off for the air compressor that can be used for any engine application.

As evident from the drawings and description provided herein, various aspects of the disclosure are contemplated. According to one aspect, there is disclosed a method that includes receiving a fresh airflow in an intake of an internal combustion engine system; pressurizing the fresh airflow with a pressure source having an inlet for receiving the fresh airflow and an outlet for the pressurized fresh airflow; and diverting a portion of the fresh airflow at the inlet of the pressure source to a diversion passage. The diversion passage is defined between an inner member mounted within the inlet of the pressure source and an adapter member mounted around the inlet of the pressure source. The inner member and the adapter member project outwardly from the inlet in a direction opposite of the fresh airflow into the inlet.

In one embodiment, the pressure source is a compressor of a turbocharger and the diversion passage is connected to an air compressor that is driven by an engine of the internal combustion engine system. In another embodiment, diverting the portion of the fresh airflow includes diverting the fresh airflow around a rounded nose of the inner member located at an entrance to the diversion passage. In another embodiment, the fresh airflow received in the diversion passage is directed to an outlet passage defined by an outlet member of the adapter member. In yet another embodiment, the inlet and the outlet of the pressure source are formed by respective portions of a housing of the pressure source.

According to another aspect, a system includes a pressure source with a housing having an inlet and an outlet. The pressure source is operable to pressurize at least a portion of an airflow received by the pressure source through the inlet and to provide the pressurized portion of the airflow to the outlet. The system further includes a diverter including an inner member mounted in the inlet of the pressure source and an adapter member mounted around the inlet. The inner member defines a first flowpath to provide the portion of the airflow to the pressure source for pressurization. The inner member and the adapter member together define a diversion passage for receiving a second portion of the airflow diverted by the inner member into the diversion passage without the second portion of the airflow being pressurized by the pressure source. The diversion passage provides the second portion of the airflow to a second flowpath.

In one embodiment, the outlet of the pressure source is connected to an internal combustion engine and the second flowpath is connected to an air compressor. In another embodiment, the pressure source is a turbocharger compressor.

In yet another embodiment, the inner member includes a cylindrical body defining an inner flow passage extending between an outlet end of the cylindrical body positioned within the inlet of the pressure source and an inlet end of the cylindrical body positioned upstream of the inlet of the pressure source. In a refinement of this embodiment, the inlet end of the cylindrical body includes a rounded nose defining a separation location between the inner flow passage of the inner member and the diversion passage. In another refinement, the inner member includes a radially outwardly extending flange adjacent the inlet end of the cylindrical body, the inlet of the housing includes an outer end portion defining an inner surface and a ledge projecting radially inwardly from the inner surface, and the flange is positioned in engagement with the ledge to secure the inner member in the inlet of the housing. In a further refinement, the inner member includes an inlet end portion extending from the flange to the inlet end of the cylindrical body, and the inlet end portion includes an outer surface that tapers along the diversion passage from the flange to the inlet end.

In another embodiment, the adapter member includes an inlet end portion defining a central passage for receiving the air flow upstream of the inlet of the housing and the inner member, and the adapter member further includes a mounting portion downstream of the inlet end portion positioned around and mounted to the inlet of the pressure source. In a refinement of this embodiment, the inlet end portion of the adapter member is spaced circumferentially from and around the inner member to define the diversion passage therebetween. In another refinement of the embodiment, the mounting portion includes an end flange positioned in abutting engagement with a mounting flange that projects radially outwardly from the inlet of the housing of the pressure source. In a further refinement, the system includes a sealing member between the end flange and the mounting flange and a clamp assembly compressively engaging the sealing member between the end flange and the mounting flange.

According to another aspect, an apparatus for diverting a portion of an airflow to an internal combustion engine is provided. The apparatus includes a diverter mountable to an inlet of a pressure source upstream of the internal combustion engine to divert the portion of the airflow to the pressure source before pressurization of the portion of the airflow by the pressure source. The diverter includes an adapter member mountable around the inlet of the pressure source and an inner member mountable in the inlet of the pressure source. The inner member and the adapter member together define a diversion passage for receiving the portion of the airflow diverted by the inner member into the diversion passage and the inner member defines a first flowpath to provide a second portion of the airflow to the pressure source for pressurization by the pressure source.

In one embodiment, the inner member includes a cylindrical body defining the first flowpath between an outlet end of the cylindrical body positioned within the inlet of the pressure source and an inlet end of the cylindrical body positioned upstream of the inlet of the pressure source. In a refinement of this embodiment, the inlet end of the cylindrical body includes a rounded nose for diverting the airflow into the diversion passage and into the first flowpath. In another refinement of this embodiment, the inner member includes a radially outwardly extending flange adjacent the inlet end of the cylindrical body, the inlet of the pressure source includes an outer end portion defining an inner surface and a ledge projecting radially inwardly from the inner surface, and the flange is positioned in engagement with the ledge to secure the inner member in the inlet of the pressure source. In a further refinement, the inner member includes an inlet end portion extending from the flange to the inlet end of the cylindrical body and the inlet end portion includes an outer surface that tapers from the flange to the inlet end along the diversion passage.

In another embodiment, the adapter member includes an inlet end portion having an inner surface defining a central passage for receiving the airflow upstream of the inlet of the pressure source and upstream of the inner member. The adapter member further includes a mounting portion positioned around and mounted to the inlet of the pressure source. In a refinement of this embodiment, the inlet end portion of the adapter member is spaced circumferentially from and around the inner member to define the diversion passage therebetween. In another refinement, the mounting portion of the adapter member includes an end flange positioned in abutting engagement with a mounting flange of the inlet of the pressure source. In a further refinement, a sealing member is between the end flange and the mounting flange and a clamp assembly compressively engages the sealing member between the end flange and the mounting flange.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    receiving a fresh airflow in an intake of an internal combustion engine system;
    pressurizing the fresh airflow with a pressure source having an inlet for receiving the fresh airflow and an outlet for the pressurized fresh airflow; and diverting a portion of the fresh airflow at the inlet of the pressure source to a diversion passage, wherein the diversion passage is defined between an inner member mounted within the inlet of the pressure source and an adapter member mounted around the inlet of the pressure source, the inner member and the adapter member projecting outwardly from the inlet in a direction opposite of the fresh airflow into the inlet.

2. The method of claim 1, wherein the pressure source is a compressor of a turbocharger and the diversion passage is connected to an air compressor that is driven by an engine of the internal combustion engine system.

3. The method of claim 1, wherein diverting the portion of the fresh airflow includes diverting the fresh airflow around a rounded nose of the inner member located at an entrance to the diversion passage.

4. The method of claim 1, wherein the fresh airflow received in the diversion passage is directed to an outlet passage defined by an outlet member of the adapter member.

5. The method of claim 1, wherein the inlet and the outlet of the pressure source are formed by respective portions of a housing of the pressure source.

6. An apparatus for diverting a portion of an airflow to an internal combustion engine, comprising:
a diverter mountable to an inlet of a pressure source upstream of the internal combustion engine to divert the portion of the airflow to the pressure source before pressurization of the portion of the airflow by the pressure source, wherein the diverter includes:
an adapter member mountable around the inlet of the pressure source;
an inner member mountable in the inlet of the pressure source, the inner member and the adapter member together defining a diversion passage for receiving the portion of the airflow diverted by the inner member into the diversion passage and the inner member defining a first flowpath to provide a second portion of the airflow to the pressure source for pressurization by the pressure source.

7. The apparatus of claim 6, wherein the inner member includes a cylindrical body defining the first flowpath between an outlet end of the cylindrical body positioned within the inlet of the pressure source and an inlet end of the cylindrical body positioned upstream of the inlet of the pressure source.

8. The apparatus of claim 7, wherein the inlet end of the cylindrical body includes a rounded nose for diverting the airflow into the diversion passage and into the first flowpath.

9. The apparatus of claim 7, wherein the inner member includes a radially outwardly extending flange adjacent the inlet end of the cylindrical body, the inlet of the pressure source includes an outer end portion defining an inner surface and a ledge projecting radially inwardly from the inner surface, and the flange is positioned in engagement with the ledge to secure the inner member in the inlet of the pressure source.

10. The apparatus of claim 9, wherein the inner member includes an inlet end portion extending from the flange to the inlet end of the cylindrical body, the inlet end portion including an outer surface that tapers from the flange to the inlet end along the diversion passage.

11. The apparatus of claim 6, wherein the adapter member includes an inlet end portion having an inner surface defining a central passage for receiving the airflow upstream of the inlet of the pressure source and upstream of the inner member, the adapter member further including a mounting portion positioned around and mounted to the inlet of the pressure source.

12. The apparatus of claim 11, wherein the inlet end portion of the adapter member is spaced circumferentially from and around the inner member to define the diversion passage therebetween.

13. The apparatus of claim 11, wherein the mounting portion of the adapter member includes an end flange positioned in abutting engagement with a mounting flange of the inlet of the pressure source.

14. The apparatus of claim 13, further comprising a sealing member between the end flange and the mounting flange and a clamp assembly compressively engaging the sealing member between the end flange and the mounting flange.

15. A system, comprising:
a pressure source including a housing with an inlet and an outlet, the pressure source operable to pressurize at least a portion of an airflow received by the pressure source through the inlet and to provide the pressurized portion of the airflow to the outlet; and
a diverter including an inner member mounted in the inlet of the pressure source and an adapter member mounted around the inlet, the inner member defining a first flowpath to provide the portion of the airflow to the pressure source for pressurization, the inner member and the adapter member together defining a diversion passage for receiving a second portion of the airflow diverted by the inner member into the diversion passage without the second portion of the airflow being pressurized by the pressure source, the diversion passage providing the second portion of the airflow to a second flowpath.

16. The system of claim 15, wherein the outlet of the pressure source is connected to an internal combustion engine and the second flowpath is connected to an air compressor.

17. The system of claim 15, wherein the pressure source is a turbocharger compressor.

18. The system of claim 15, wherein the inner member includes a cylindrical body defining an inner flow passage extending between an outlet end of the cylindrical body positioned within the inlet of the pressure source and an inlet end of the cylindrical body positioned upstream of the inlet of the pressure source.

19. The system of claim 18, wherein the inlet end of the cylindrical body includes a rounded nose defining a separation location between the inner flow passage of the inner member and the diversion passage.

20. The system of claim 18, wherein the inner member includes a radially outwardly extending flange adjacent the inlet end of the cylindrical body, the inlet of the housing including an outer end portion defining an inner surface and a ledge projecting radially inwardly from the inner surface, and the flange is positioned in engagement with the ledge to secure the inner member in the inlet of the housing.

21. The system of claim 20, wherein the inner member includes an inlet end portion extending from the flange to the inlet end of the cylindrical body, the inlet end portion including an outer surface that tapers along the diversion passage from the flange to the inlet end.

22. The system of claim 15, wherein the adapter member includes an inlet end portion defining a central passage for receiving the air flow upstream of the inlet of the housing and the inner member, the adapter member further including a mounting portion downstream of the inlet end portion positioned around and mounted to the inlet of the pressure source.

23. The system of claim 22, wherein the inlet end portion of the adapter member is spaced circumferentially from and around the inner member to define the diversion passage therebetween.

24. The system of claim 22, wherein the mounting portion includes an end flange positioned in abutting engagement with a mounting flange that projects radially outwardly from the inlet of the housing of the pressure source.

25. The system of claim 24, further comprising a sealing member between the end flange and the mounting flange and a clamp assembly compressively engaging the sealing member between the end flange and the mounting flange.

* * * * *